(12) United States Patent
Werner et al.

(10) Patent No.: US 10,690,508 B2
(45) Date of Patent: Jun. 23, 2020

(54) NAVIGATIONAL SYSTEM UTILIZING LOCAL DRIVER BASED ROUTE DEVIATIONS

(71) Applicant: INTERNATIONAL BUSINESS MACHINES CORPORATION, Armonk, NY (US)

(72) Inventors: John S. Werner, Fishkill, NY (US); Ali Y. Duale, Poughkeepsie, NY (US); Arkadiy O. Tsfasman, Wappingers Falls, NY (US); Shailesh R. Gami, Poughkeepsie, NY (US); Louis P. Gomes, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 15/943,789

(22) Filed: Apr. 3, 2018

(65) Prior Publication Data

US 2019/0301880 A1   Oct. 3, 2019

(51) Int. Cl.
*G01C 21/34* (2006.01)
*G01C 21/36* (2006.01)
*G01C 21/28* (2006.01)

(52) U.S. Cl.
CPC ......... *G01C 21/3492* (2013.01); *G01C 21/28* (2013.01); *G01C 21/3415* (2013.01); *G01C 21/3691* (2013.01)

(58) Field of Classification Search
CPC . G01C 21/3461; G01C 21/3484; G01C 21/34
See application file for complete search history.

(56) References Cited

U.S. PATENT DOCUMENTS

| 5,089,963 | A  | 2/1992 | Takahashi |
| 6,216,086 | B1 | 4/2001 | Seymour et al. |

(Continued)

FOREIGN PATENT DOCUMENTS

| WO | 9002388      | 3/1990 |
| WO | 2017100780 A1 | 6/2017 |

OTHER PUBLICATIONS

Ceikute, Vaida et al., "Routing Service Quality—Local Driver Behavior Versus Routing Services", 2013 IEEE 14th International Conference on Mobile Data Management, pp. 97-106.

(Continued)

*Primary Examiner* — Thomas G Black
*Assistant Examiner* — Sara J Lewandroski
(74) *Attorney, Agent, or Firm* — Cantor Colburn LLP; Teddi Maranzano

(57) ABSTRACT

Methods, systems and computer program products for providing navigation based on local-driver route deviations are provided. Aspects include monitoring drivers and storing a route that each of the drivers take from an origin to a destination and a number of times that each of the drivers has traveled the route. Aspects also include classifying one or more drivers as local drivers based on a determination that the number of times the one or more drivers traveled the route is greater than a threshold number and receiving a routing request from a driver including a starting point and an endpoint and calculating an expected route from the starting point to the endpoint. Aspects further include calculating a generated route from the starting point to the endpoint, wherein calculating includes determining routes local drivers have taken from the starting point to the endpoint and providing the generated route to the driver.

17 Claims, 9 Drawing Sheets

(56) References Cited

U.S. PATENT DOCUMENTS

| | | | |
|---|---|---|---|
| 6,321,161 | B1 | 11/2001 | Herbst et al. |
| 6,405,130 | B1 | 6/2002 | Piwowarski |
| 8,024,114 | B2 | 9/2011 | Doyle |
| 8,412,445 | B2 | 4/2013 | Uyeki |
| 8,700,296 | B2 | 4/2014 | Chapman et al. |
| 8,825,395 | B2 | 9/2014 | Boss et al. |
| 9,254,824 | B2 | 2/2016 | Ko et al. |
| 2006/0173618 | A1 | 8/2006 | Eyer et al. |
| 2009/0287405 | A1* | 11/2009 | Liu .................. G01C 21/20 701/119 |
| 2012/0078493 | A1* | 3/2012 | Schunder ............ G01C 21/32 701/117 |
| 2012/0215432 | A1 | 8/2012 | Uyeki |
| 2014/0163863 | A1* | 6/2014 | Kirsch ............. G01C 21/3679 701/400 |
| 2015/0112919 | A1* | 4/2015 | Weir ............... G01C 21/3476 706/52 |
| 2015/0160025 | A1 | 6/2015 | Konig |
| 2015/0168175 | A1 | 6/2015 | Abramson et al. |
| 2015/0198452 | A1 | 7/2015 | Gupta et al. |
| 2015/0260532 | A1 | 9/2015 | Sanio et al. |
| 2015/0292893 | A1 | 10/2015 | Bartsch et al. |
| 2016/0123748 | A1* | 5/2016 | Chidlovskii ....... G01C 21/3453 701/410 |
| 2017/0107919 | A1 | 4/2017 | Kim |
| 2017/0323249 | A1 | 11/2017 | Khasis |
| 2017/0328725 | A1* | 11/2017 | Schlesinger ....... G01C 21/3461 |
| 2018/0051997 | A1* | 2/2018 | Grochocki, Jr. ... G01C 21/3415 |
| 2018/0058875 | A1* | 3/2018 | Wan ................. G01C 21/3641 |
| 2019/0017835 | A1* | 1/2019 | Pickover ............. G06F 16/29 |
| 2019/0049259 | A1* | 2/2019 | Galan-Oliveras ....................... G01C 21/3407 |
| 2019/0049262 | A1* | 2/2019 | Grimm ............. G01C 21/3492 |
| 2019/0113350 | A1* | 4/2019 | Ngu ..................... G06F 16/29 |
| 2019/0193751 | A1* | 6/2019 | Fernando ......... G08G 1/096888 |
| 2019/0226864 | A1* | 7/2019 | Miyazaki .......... G01C 21/3641 |

OTHER PUBLICATIONS

Duale, Ali Y. et al. entitled "Road-Condition Based Routing System" U.S. Appl. No. 15/943,791, filed Apr. 3, 2018.

List of IBM Patents or Patent Applications Treated as Related; (Appendix P), Date Filed Apr. 3, 2018; 2 pages.

IBM "List of IBM Patents or Patent Applications Treated as Related (Appendix P)"; Filed May 3, 2018, 2 pages.

John S. Werner et al., "Local Driver Pattern Based Notifications", U.S. Appl. No. 15/969,971, filed May 3, 2018.

Moosavi, Sobhan "Characterizing Driving Context from Driver Behavior" SIGSpatial'17, Nov. 7-10, 2017, 4 pgs.

Moosavi, Sobhan et al., "Trajectory Annotation by Discovering Driving Patterns", UrbanGIS'17, Nov. 7-10, 2017; 4 pgs.

Pantaenius Yacht Insurance "The Benefits of Weather Routing"; Dated Nov. 21, 2013; downloaded from Internet: http://pantaenius.us/en/news-events/news/newsartikel/news/the-benefits-of-weather-routing.html; Mar. 12, 2018; 2 pgs.

Zhang, Daqing et al. "iBAT: Detecting Anomalous Taxi Trajectories from GPS Traces"; UbiComp'11, Sep. 17-21, 2011; pp. 99-108.

Ziebart, Brian D. et al., "Navigate Like a Cabbie: Probabilistic Reasoning from Observed Context-Aware Behavior"; UbiComp'08, Sep. 21-24, 2008; pp. 322-331.

\* cited by examiner

NAVIGATIONAL SYSTEM UTILIZING LOCAL DRIVER BASED ROUTE DEVIATIONS

BACKGROUND

The invention relates generally to navigation and, more specifically, to navigation based on observed route deviations by local drivers.

Increasingly, global positioning systems (GPSs), handheld devices, and online map routing services provide mechanisms to navigate from one point to another by calculating paths based on information derived from roadway maps. These routing services typically have added features to automatically calculate the type of directions desired. For example, added features may allow an operator to specify routing objectives such as: shortest distance (using an algorithm to determine the shortest distance from one point to the next); least amount of travel time (using an algorithm to determine the shortest distance based on the road's speed limit and distance, and calculating the resulting driving time); least use of freeways; least use of energy (gasoline and/or electricity); and least use of toll roads.

While the routing system provides some routing objectives, there may be features of certain roads that drivers would like to avoid but said features are not typically shared through traditional routing systems. For example, a driver may wish to avoid a route in which the sunrise or sunset is right in the driver's field of view, a route that overlaps with a school bus route, a route with unexpected traffic due to a local event, recent road construction in progress, or frequent slow moving vehicles.

SUMMARY

According to an embodiment, a navigation system is provided. The system includes a memory having computer readable computer instructions, and a processor for executing the computer readable instructions. The computer readable instructions include monitoring a plurality of drivers and storing, in a route database, a route that each of the plurality of drivers take from an origin to a destination and a number of times that each of the plurality of drivers has traveled the route. The computer readable instructions also include classifying one or more drivers of the plurality of drivers as local drivers based on a determination that the number of times the one or more drivers traveled the route is greater than a threshold number. The computer readable instructions further include receiving a routing request from a driver including a starting point and an endpoint and calculating an expected route from the starting point to the endpoint and calculating a generated route from the starting point to the endpoint, wherein calculating includes determining routes local drivers have taken from the starting point to the endpoint. The computer readable instructions also include providing the generated route to the driver.

According to another embodiment, a method for providing navigation based on local-driver route deviations is provided. The method includes monitoring a plurality of drivers and storing, in a route database, a route that each of the plurality of drivers takes from an origin to a destination and a number of times that each of the plurality of drivers has traveled the route. The method also includes classifying one or more drivers of the plurality of drivers as local drivers based on a determination that the number of times the one or more drivers traveled the route is greater than a threshold number. The method further includes receiving a routing request from a driver including a starting point and an endpoint and calculating an expected route from the starting point to the endpoint and calculating a generated route from the starting point to the endpoint, wherein calculating includes determining routes local drivers have taken from the starting point to the endpoint. The method further includes providing the generated route to the driver.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes monitoring a plurality of drivers and storing, in a route database, a route that each of the plurality of drivers take from an origin to a destination and a number of times that each of the plurality of drivers has traveled the route. The method also includes classifying one or more drivers of the plurality of drivers as local drivers based on a determination that the number of times the one or more drivers traveled the route is greater than a threshold number. The method further includes receiving a routing request from a driver including a starting point and an endpoint and calculating an expected route from the starting point to the endpoint and calculating a generated route from the starting point to the endpoint, wherein calculating includes determining routes local drivers have taken from the starting point to the endpoint. The method further includes providing the generated route to the driver.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Figure 1:
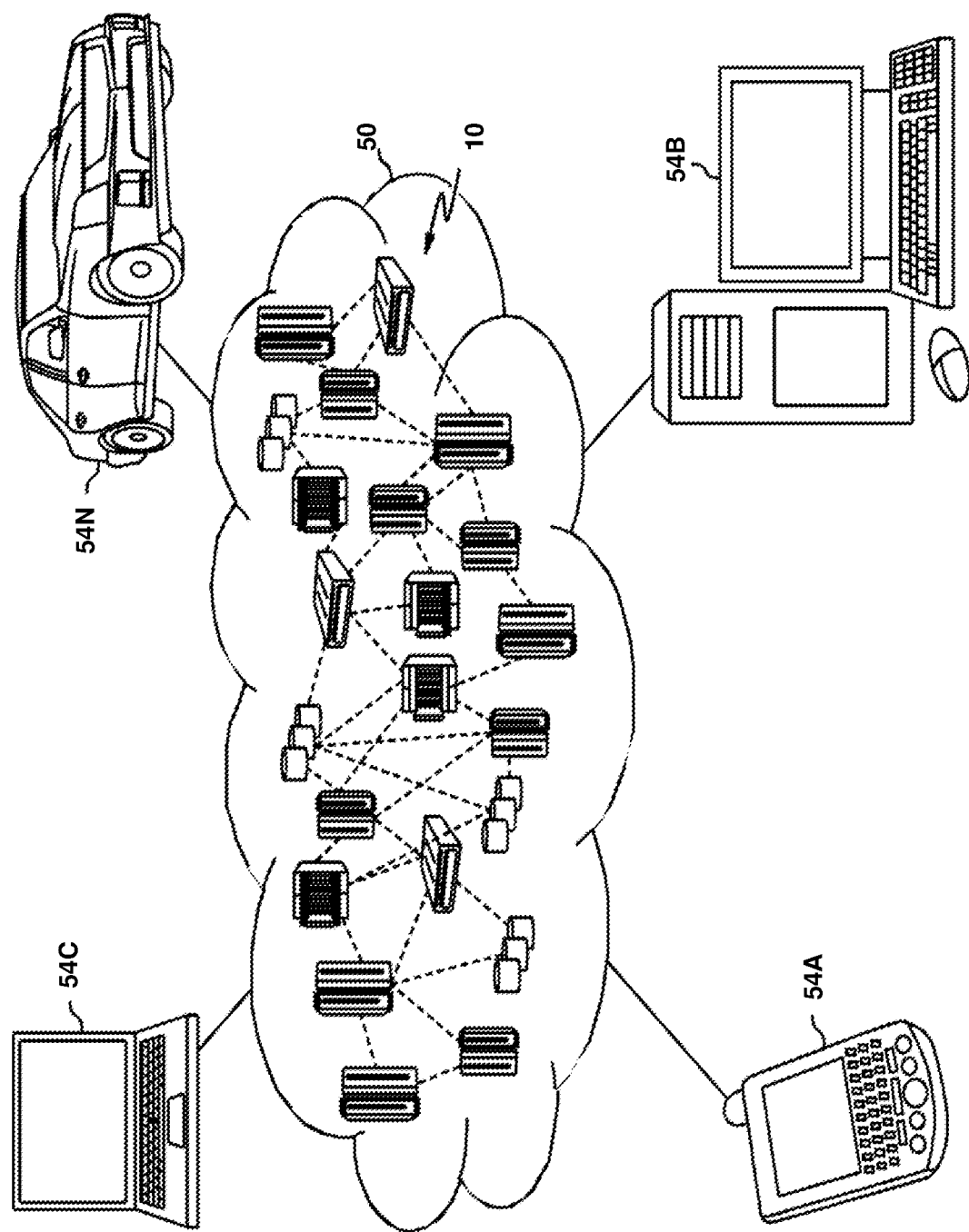
FIG. 1 depicts a cloud computing environment according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
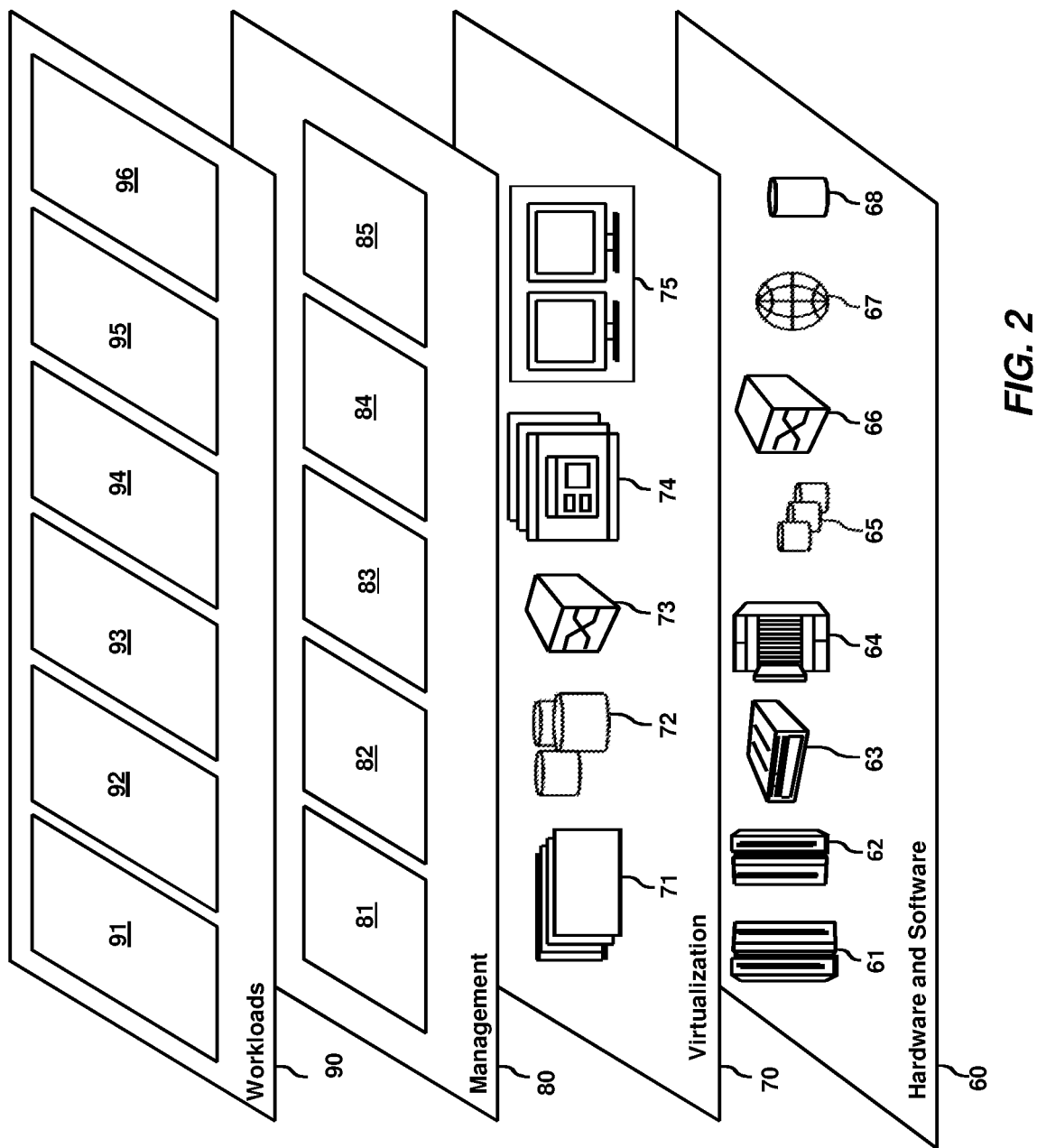
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vehicle routing 96.

Figure 3:
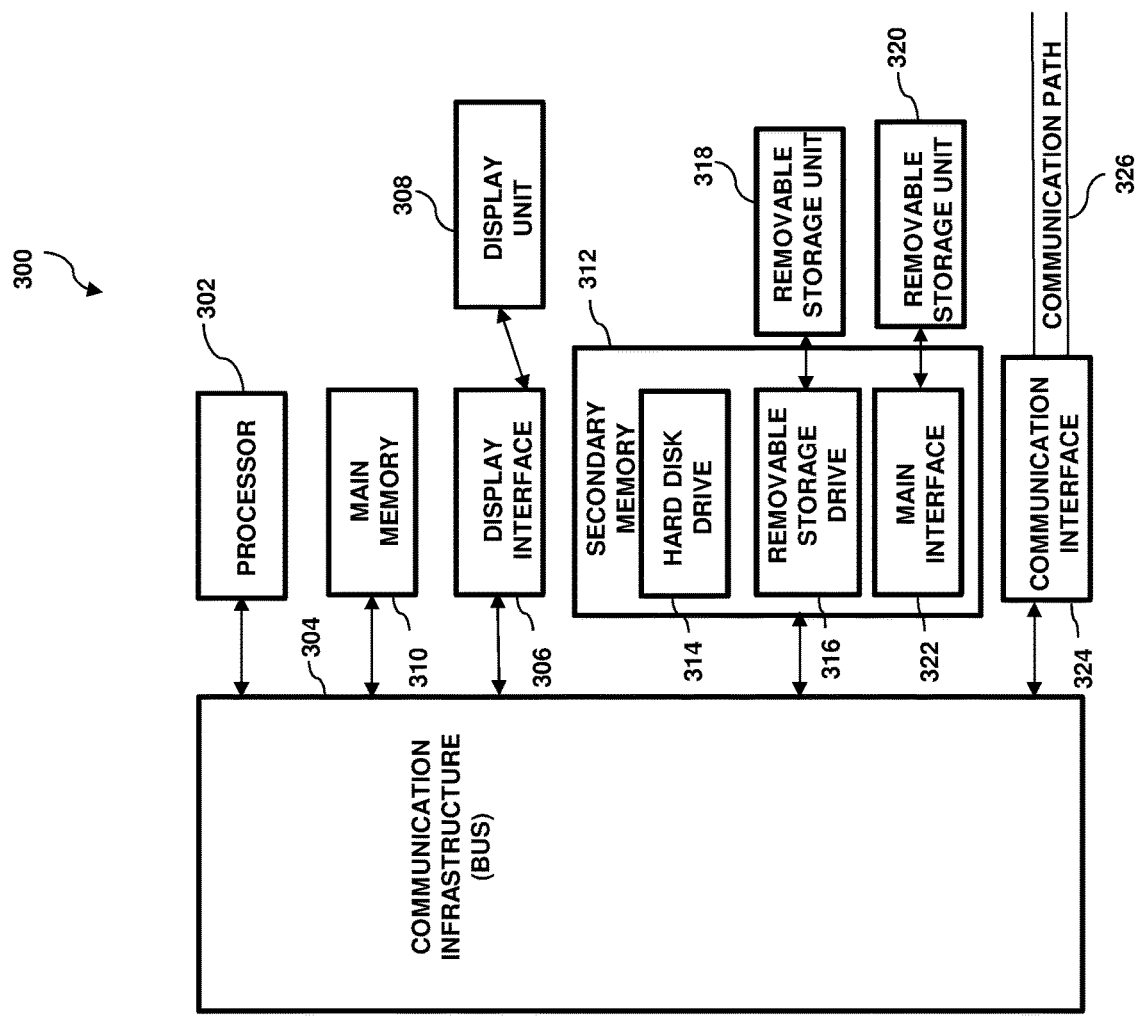
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Navigation systems offer useful directions to drivers who require assistance in locating a desired destination address in an area that is unfamiliar to them or for helping a user in selecting an optimal route to the desired destination address. As discussed above, vehicle routing systems typically allow a user to select a routing objective such as shortest distance; least amount of travel time; least use of freeways; and least use of toll roads.

In many cases, local drivers have knowledge of various conditions that cause them to take routes that deviate from expected routes. For example, a local driver may avoid an area around a school during certain times of the day during the school year. Likewise, a local driver may take a route that avoids recent road construction or deteriorated road conditions that are not yet known by routing systems. In exemplary embodiments, drivers are categorized as either local or non-local drivers on a per route basis. For example, a local drive may be a driver that has driven on the exact section of road in the current conditions greater than a predefined threshold number of times (e.g., 10 times) which is tracked in the user's account. Accordingly, a driver may be identified as a non-local driver even though they live in the area if they have not driven on a specific road greater than the threshold number of times. In addition, a driver may be identified as a non-local if they have exceeded the threshold on a given road, but have never been on the said road in the current conditions (e.g., snow). Furthermore, a driver may be identified as a non-local if they have exceeded the threshold on a given road, but have not driven on said road in a long time (e.g., 1 year) or if it is known that there has been construction on said road since the last time the driver was there (e.g., a lane was closed).

In accordance with exemplary embodiments, a system is provided that monitors the way in which individuals, local to an area, drive on their local roads in certain conditions. The system is configured to extract driving routes of local drivers that deviate from expected routes and to record the conditions at the time that the route was traversed. The system stores and analyzes the route deviations and can provide routing to non-local drivers based on the observed route deviations and the current conditions.

Figure 4:
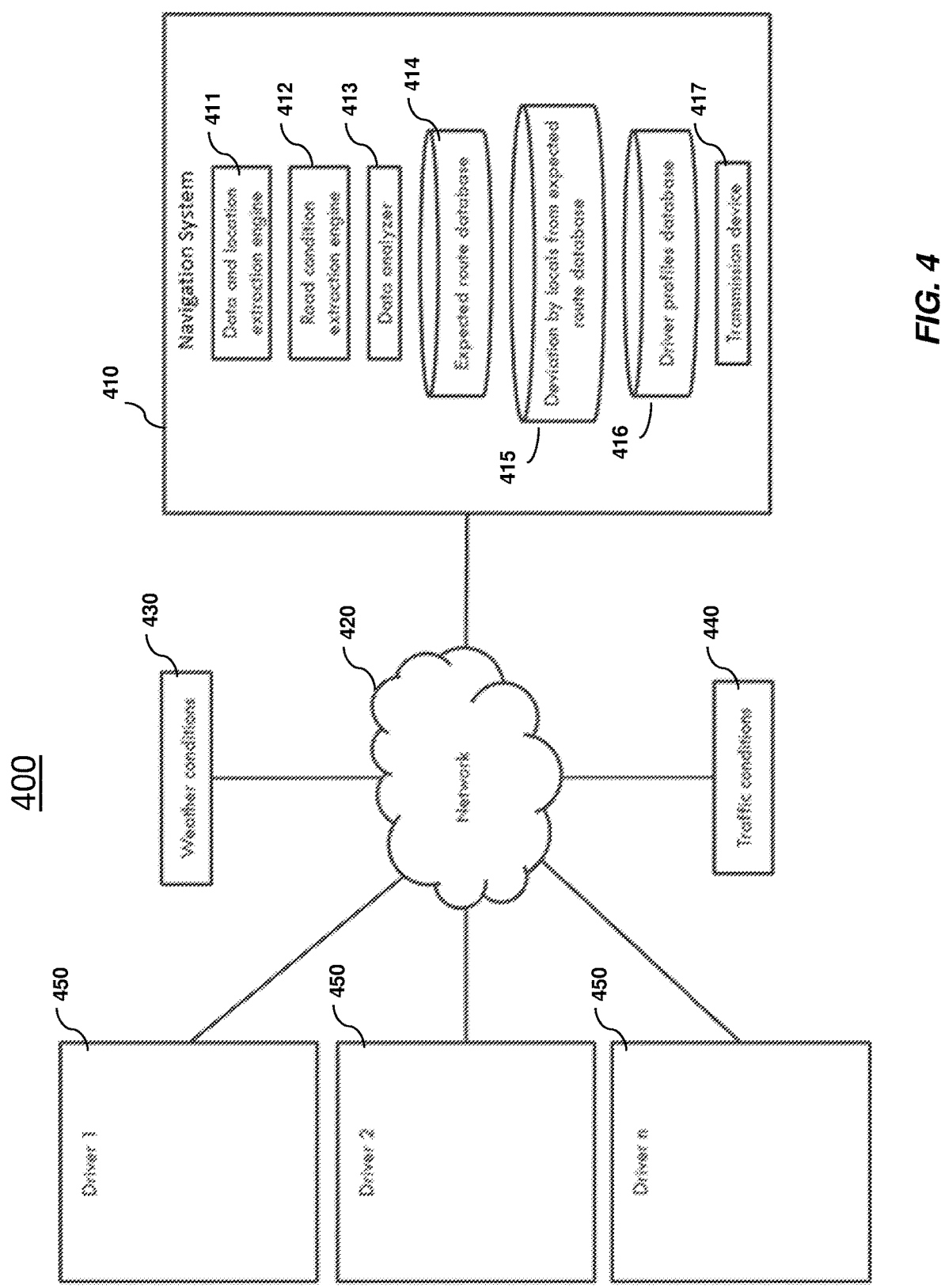
FIG. 4 depicts a system upon which vehicle routing and navigation processes may be implemented according to one or more embodiments of the present invention.

Turning now to FIG. 4, a system 400 upon which the vehicle routing and navigation processes may be implemented will now be described in an embodiment. The system 400 shown in FIG. 4 includes a navigation system 410, which in turn includes a data and location extraction engine 411, a road condition extraction engine 412, a data analyzer 413, an expected route database 414, a deviation by locals from expected route database 415, driver profiles database 416, and a transmission device 417. In exemplary embodiments, the navigation system 410 may be embodied in a computer system 300, as shown in FIG. 3, or in a cloud based processing system such as shown and described with regards to FIGS. 1 and 2. The system 400 also includes a weather conditions database 430 and a traffic conditions database 440 that are accessible to the navigation system 410 via a communications network 420. The system 400 further includes a plurality of driver's devices 450 that are in communication with the navigational system 410 via the communications network 420. The driver's device 450 may be a user's mobile device or a navigational system built into the vehicle's computer. The communications network 420 may be one or more of, or a combination of, public (e.g., Internet), private (e.g., local area network, wide area network, virtual private network), and may include wireless and wireline transmission systems (e.g., satellite, cellular network, terrestrial networks, etc.). In exemplary embodiments, the driver's device 450 may be configured to transmit data (e.g., vehicle type, speed, outside temperature, wheel slip, etc.) and location to the navigational system 410.

The weather conditions database 430 may be any available weather forecasting system that is publically available such as the service provided by the National Weather Service or the like. In exemplary embodiments, the weather conditions database 430 provides weather forecasts for any requested time period and any requested location. In addition, the weather conditions database 430 stores actual recorded weather data and can provide the weather conditions for requested locations and time periods in the past. The traffic condition database 440 is configured to store data that relates to one or more of the current traffic conditions on roads and the historical traffic data for roads.

Figure 5:
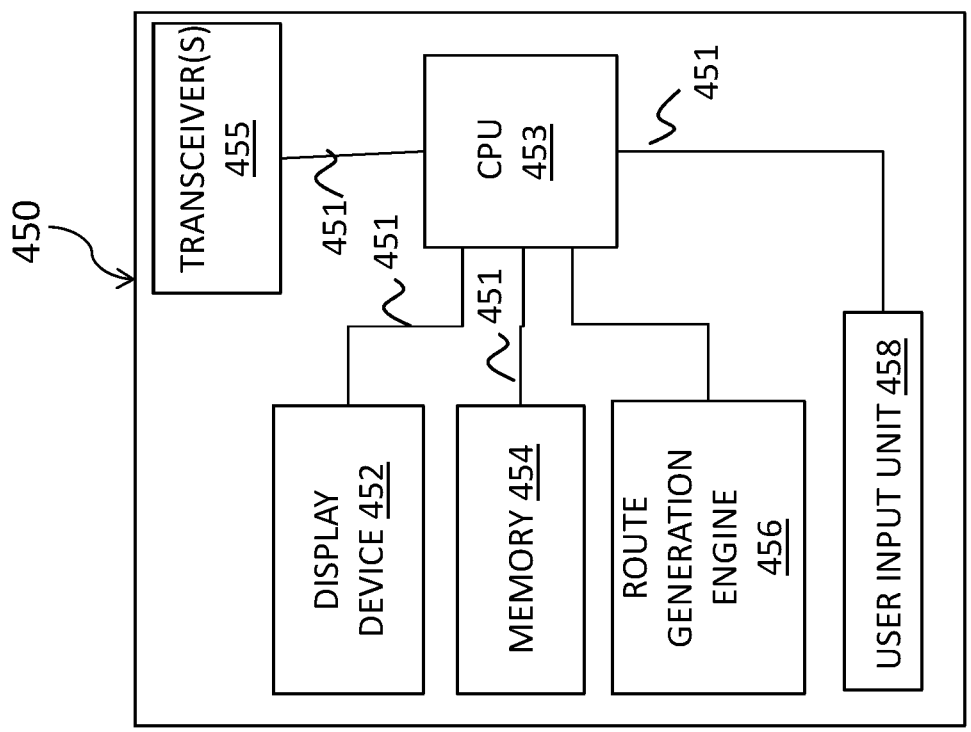
FIG. 5 depicts a driver's device according to one or more embodiments of the present invention.

FIG. 5 illustrates a driver's device 450 in accordance with an embodiment. In an embodiment, the transceiver 455 is configured to receive signals from a global positioning system (GPS) and to communicate with various other systems via the networks 420. The processor 453 is configured to receive inputs (e.g., the desired destination location) from a user via the user input unit 458. In an embodiment, the processor 453 may be integrated into a vehicle control module such as, for example, an infotainment control module or a navigation control module. The user input unit 458 may be implemented as a keypad, a keyboard, or microphone for allowing a user to input information, such as a destination address. In an embodiment, the display device 452 may be a liquid crystal display (LCD) screen that is used to display graphics and text. The display device 452 displays routes generated by the route generation engine 456. Although FIG. 5 illustrates the user input unit 458 and the display device 452 as separate components, it is understood that the user input unit 458 and the display device 452 may be a combined unit as well. For example, in an embodiment the display device 452 is a touchscreen that detects the presence and location of a user's touch.

In an embodiment, the memory 454 stores a database of maps for generating routes. The memory 454 also stores routes that have previously been driven by a user of the vehicle. In a further embodiment, the memory 454 may store a profile of a user that includes various routes taken by the user and the conditions at the time that the user traveled the route. The route generation engine 456 includes a mapping tool that takes as input a starting location (e.g., address) and a destination location and returns as output one or more routes to follow to get from the starting location to the destination location subject to routing objectives. The route generation engine 456 accesses a database of maps (e.g., stored in the memory 454 for generating the routes and also stores previously generated routes). The route generation engine 456 receives weather data and traffic data and factors the received data when determining the route to be provided to the user. In exemplary embodiments, the route generation engine 456 is configured to communication with the navigational system 410, shown in FIG. 4, to generate routes based on deviations from the expected route by local drivers.

Figure 6:
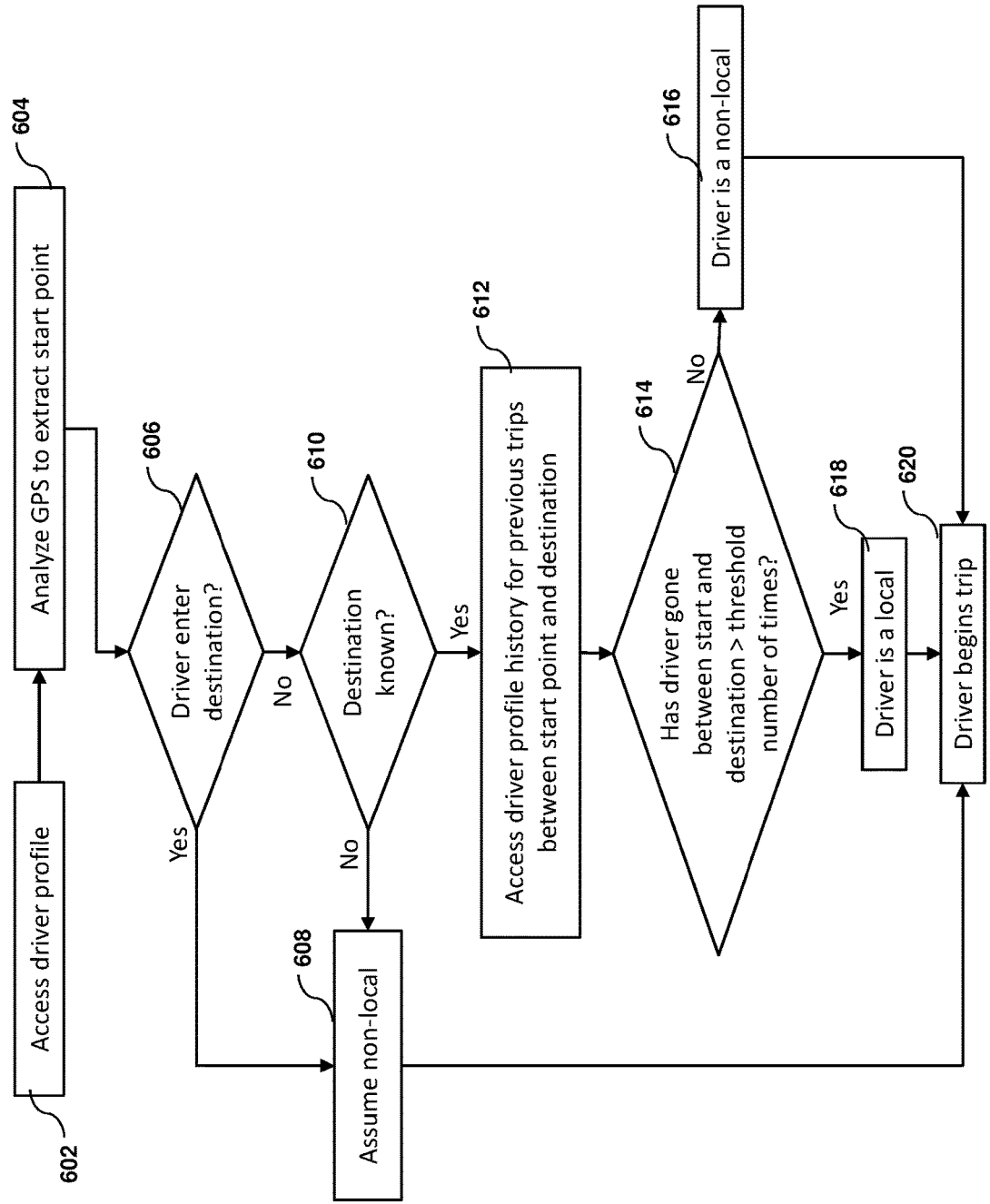
FIG. 6 depicts a flow diagram of a method for classifying a driver as a local or non-local driver providing routing based on road conditions according to one or more embodiments of the present invention.

Turning now to FIG. 6, a flow diagram of a method 600 for determining whether a driver is a local driver in accordance with an embodiment is shown. The method 600 begins at block 602 where a driver profile for the driver is accessed. In exemplary embodiments, the user may be logged in automatically when their vehicle starts, the user's mobile device may recognize that the user is in a vehicle based on a rapid change in GPS location (due to a moving vehicle), connection to the vehicle via Bluetooth or some other wireless protocol, or the user may physically log into an application. Next, as shown at block 604, the method 600 includes analyzing the GPS of the driver device to identify a starting point, or origin. Next, as shown at decision block 606, the method 600 includes determining if the driver entered a destination address. If the driver entered a destination address, the method proceeds to block 608 and the driver is assumed to be a non-local. If the driver did not enter a destination address, the method proceeds to decision block 610 and determines whether the destination of the driver is known. In exemplary embodiments, the destination is considered to be known if the navigation system determines that a likely destination with a confidence level above a threshold amount. The navigation system can calculate a destination and associated confidence level based on the user profile, user calendar, and driving history (e.g., the driver typically leaves for work every morning at 7 am from Monday through Friday so the navigation system has high confidence that the driver is going to work if they get in their vehicle at 6:58 am on a Wednesday).

If the destination if the driver is not known, the method proceeds to block 608 and the driver is initially assumed to be a non-local. If the destination of the driver is known, the method proceeds to block 612 and accesses a driver profile history for previous trips between the origin and destination. Next, as shown at decision block 614, the method determines if a driver has travelled between the origin and destination greater than a threshold number of times. If the driver has travelled between the origin and destination greater than a threshold number of times (e.g., driving from home to work), the driver is considered a local driver, as shown at block 618. Otherwise, the driver is considered a non-local driver as shown at block 616 (e.g., the destination may be known to be a baseball stadium at block 610 based on the user entering the date and time of the game in their calendar, but they have only been to the stadium once before). In exemplary embodiments, the threshold value is larger than one because a driver who has completed a specific route once in the past, may still not be familiar with that route or other roads in the area. In addition, the threshold value may also consider time (e.g., the user has been on the specified route at least 3 times in the past 6 months). Next, the driver begins their trip, as shown at block 620.

Figure 7:
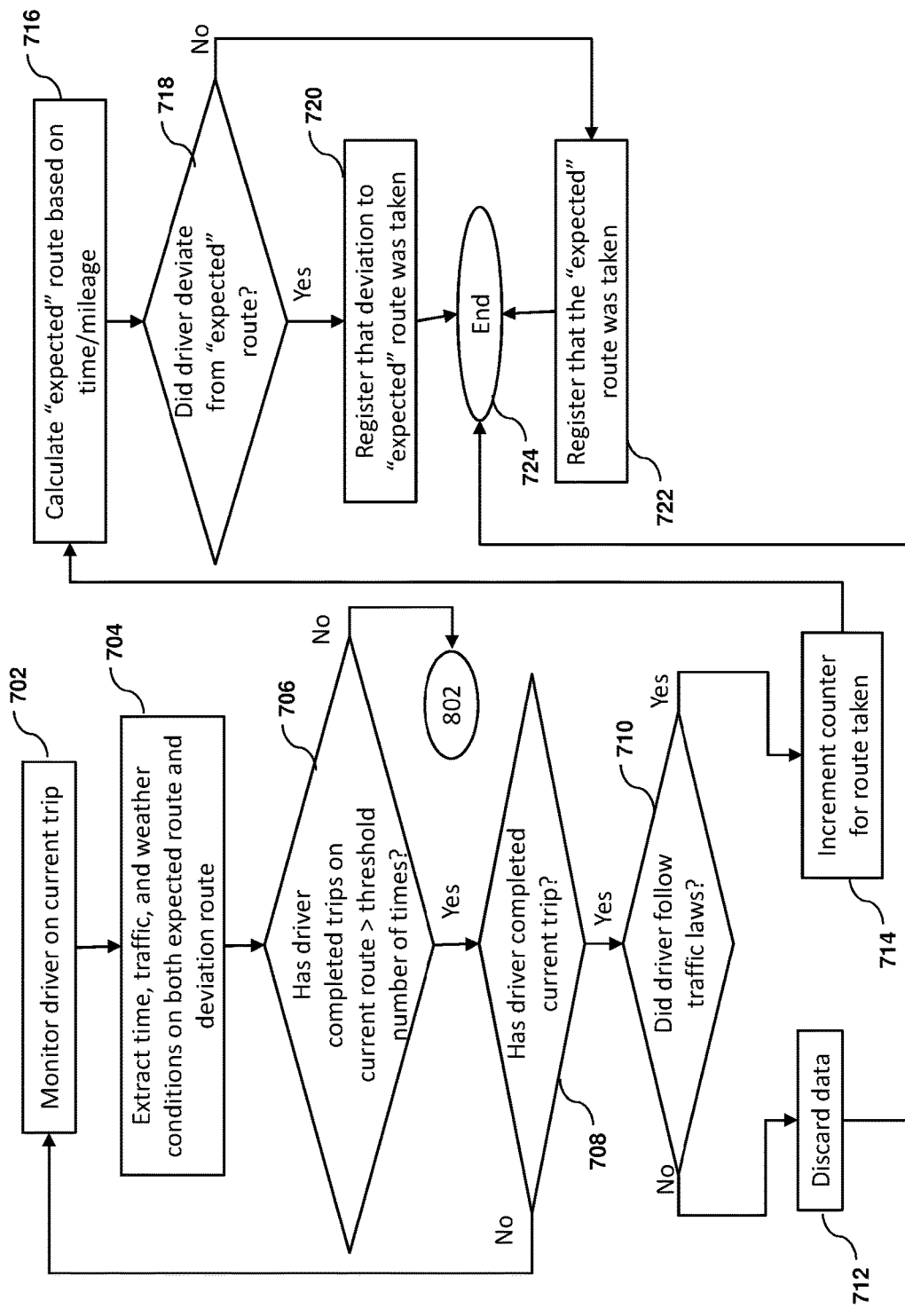
FIG. 7 depicts a flow diagram of a method for monitoring a local driver according to one or more embodiments of the present invention.

Turning now to FIG. 7, a flow diagram of a method 700 for monitoring a local driver in accordance with an embodiment is shown. As shown at block 702, the method 700 includes monitoring a driver on a current trip. Next, as shown at block 704, the method 700 includes extracting time, traffic, and weather conditions on both the expected route and a deviated route (if the local driver does not follow the expected route). As shown at decision block 706, the method includes determining if the driver has travelled between the origin and destination greater than a threshold number of times. If the driver has not travelled between the origin and destination greater than a threshold number of times, the driver is considered a non-local driver and the method 700 proceeds to block 802. This may indicate that the initial assumption that a driver was a local driver made at block 618 in FIG. 6 was incorrect (e.g., the driver was assumed to be going to work when leaving at 6:58 am on a Wednesday as described earlier, but they happened to have a doctor's appointment that morning at an office they have never driven to before and they did not enter the destination in their GPS). Otherwise, the method 700 proceeds to decision block 708 and it is determined if the driver has completed the current trip. If the trip has not been completed the method returns to block 702 and continues to monitor the driver on the current trip. Otherwise, the method 700 proceeds to decision block 708 and it is determined if the driver followed the traffic laws along the route. If the driver did not follow the traffic laws along the route, the method 700 proceeds to block 712 and discards the data from the route. Otherwise, the method 700 proceeds to block 714 and increments the counter for the route.

Continuing with reference to FIG. 7, the method 700 includes calculating an expected route based on trip duration or length, as shown at block 716. Next, as shown at decision block 718, it is determined if the driver deviated from the expected route. If the driver deviated from the expected route, the method 700 proceeds to block 720 and registers that a deviation to the expected route was taken. If the driver takes the expected route, the method 700 proceeds to block 722 and registers that the expected route was taken. The method 700 ends at block 724.

Figure 8:
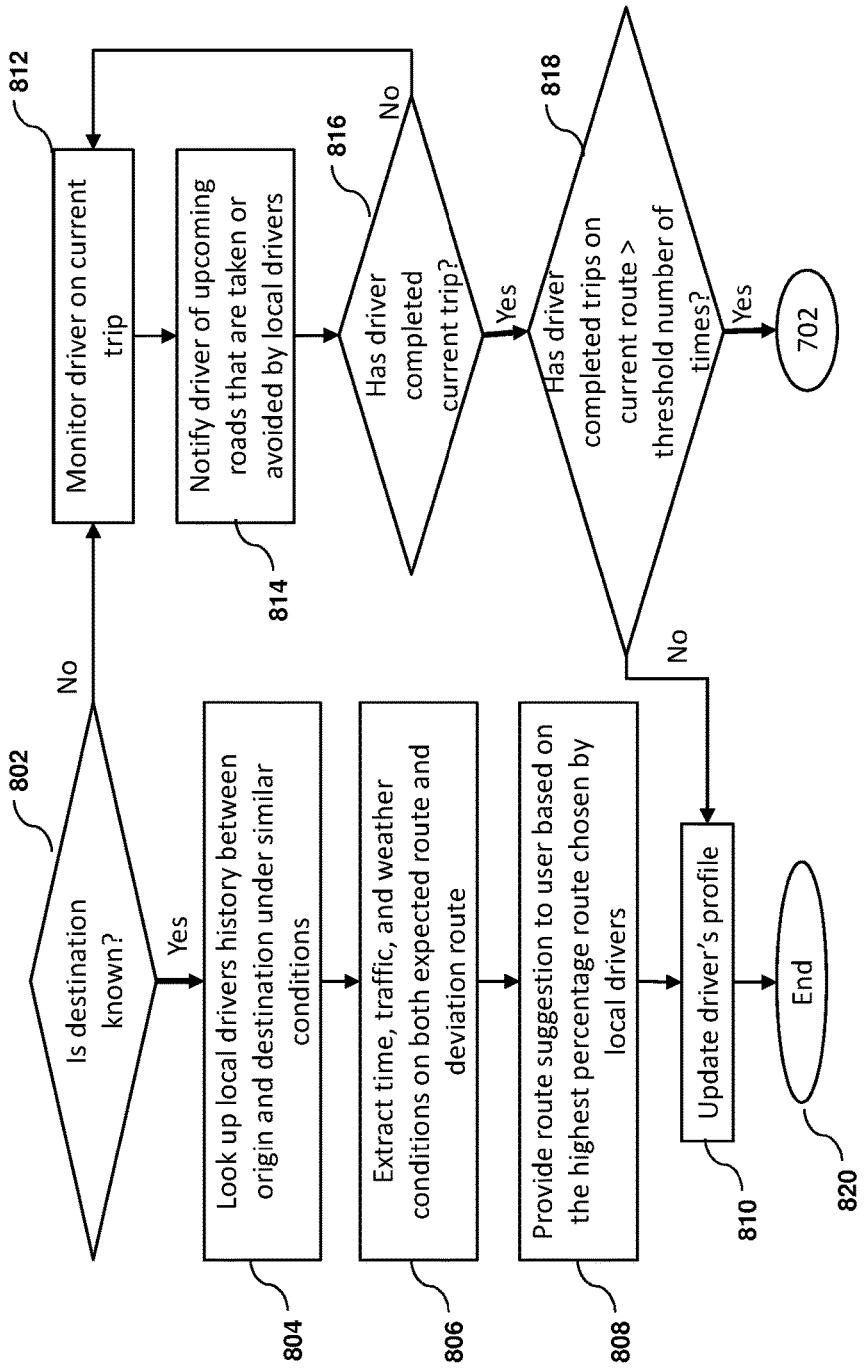
FIG. 8 depicts a flow diagram of a method for monitoring a non-local driver according to one or more embodiments of the present invention.

Turning now to FIG. 8, a flow diagram of a method 800 for monitoring a non-local driver in accordance with an embodiment is shown. As shown at decision block 802, the method 800 includes determining if the destination is known. If the destination is known, the method proceeds to block 804. Next, as shown at block 804, the method 800 includes looking up a local drivers' history between the origin and the destinations under similar conditions. The method 800 also includes extracting time, traffic, and weather conditions on both the expected route and a deviation route if one is identified after checking the history of local drivers, as shown a block 806. In exemplary embodiments, the origin and the destinations for a current route may be approximately the same as the origin and the destinations associated with the local driver history, i.e., the routes do not have to originate and terminate at the same addresses but only in similar areas. As shown at block 808, the method 800 includes providing route suggestion to the user based on the highest percentage route chosen by local drivers in the current conditions. The method then proceeds to block 810 and updates the profile of the driver.

Continuing with reference to FIG. 8, based on a determination that the destination is known, the method proceeds to block 812 and monitors the drive on the current trip. Next, as shown at block 814, the method 800 notifies the driver of upcoming roads that are taken or avoided by local drivers. Notifications may come via a mobile device, an in-car navigation system, speakers within the vehicle, a heads-up display in the vehicle, etc. As shown at decision block 816, the method 800 includes determining if the driver has completed their current trip. If the user has not completed their current trip, the method 800 returns to block 812. Otherwise, the method 800 proceeds to decision block 818 and determines if the driver has completed trips on the current route greater than a threshold number of times. If the driver has completed trips on the current route greater than a threshold number of times, it is determined that the driver is a local and the method 800 proceeds to block 702. Otherwise, the method proceeds to block 810 and updates the profile of the driver. The method 800 ends at block 820.

Figure 9:
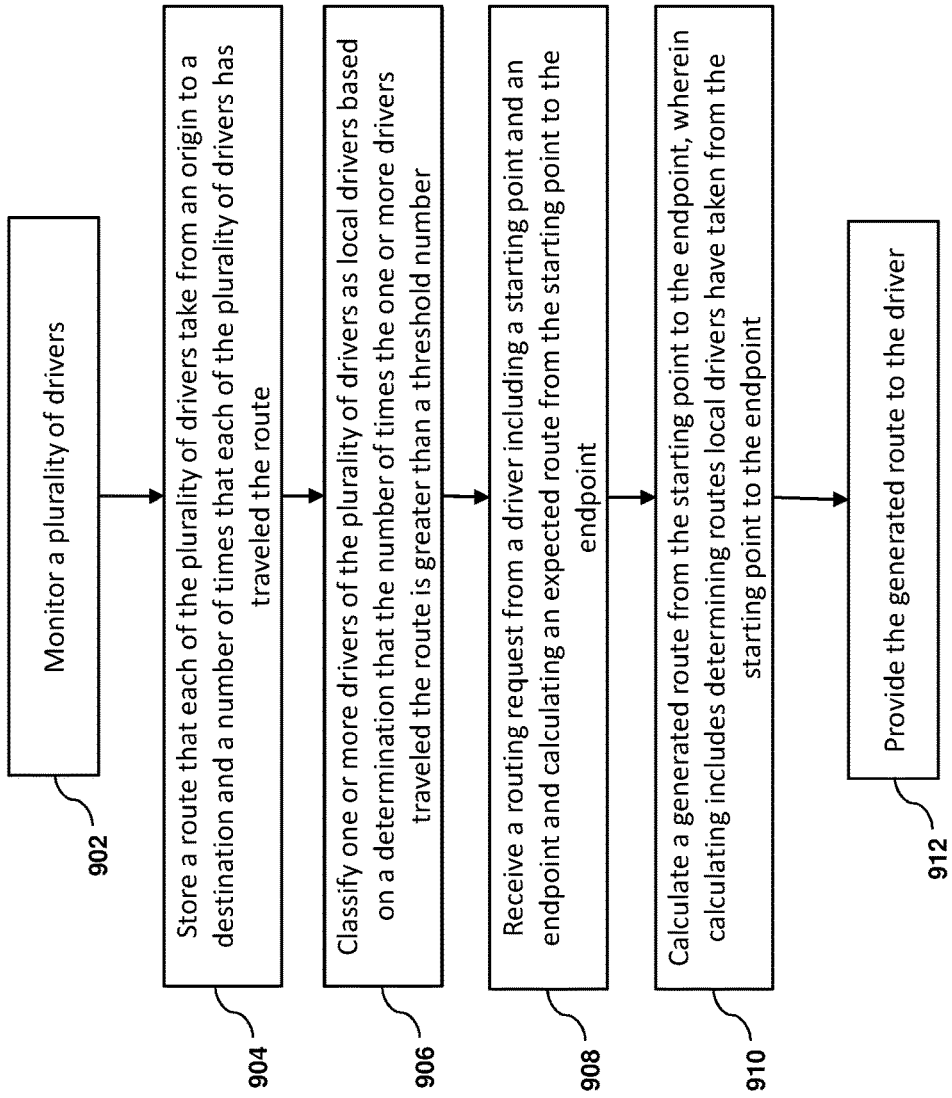
FIG. 9 depicts a flow diagram of a method for providing navigation based on local-driver route deviations according to one or more embodiments of the present invention.

Turning now to FIG. 9, a flow diagram of a method 700 for providing route guidance based on local driver route deviations in accordance with an embodiment is shown. As shown at block 902, the process 900 includes monitoring a plurality of drivers. Next, as shown at block 904, the method 900 includes storing, in a route database, a route that each of the plurality of drivers takes from an origin to a destination and a number of times that each of the plurality of drivers has traveled the route. In exemplary embodiments, the route database includes a deviation database that includes deviations by local drivers from expected routes between the origin and the destination. The method 900 also includes classifying one or more drivers of the plurality of drivers as local drivers based on a determination that the number of times the one or more drivers traveled the route is greater than a threshold number, as shown at block 906. Next, as shown at block 908, the method 900 includes receiving a routing request from a driver including a starting point and an endpoint and calculating an expected route from the starting point to the endpoint. In exemplary embodiments, the expected route between the starting point and the endpoint is one of the shortest route between the starting point and the endpoint and a fastest route between the starting point and the endpoint. As shown at block 910, the method 900 further includes calculating a generated route from the starting point to the endpoint, wherein calculating includes determining routes local drivers have taken from the starting point to the endpoint. The method 900 concludes at block 912 by providing the generated route to the driver.

In exemplary embodiments, the deviation database includes one or more conditions associated with each stored deviation and wherein calculating the generated route further includes comparing one or more current conditions to the one or more conditions associated with each stored deviation. The one or more conditions associated with each stored deviation include one of a time, a date, a traffic condition, and a weather condition. In exemplary embodiments, calculating the generated route further includes determining a percentage of local drivers that have taken a route other than the expected route between the starting point and the endpoint and responsively setting the generated route to the expected route when the percentage is less than a threshold percentage.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A vehicle navigation system, comprising:
a memory having computer readable instructions; and
a processor for executing the computer readable instructions, the computer readable instructions including:
monitoring a plurality of drivers;
storing, in a route database, a route that each of the plurality of drivers take from an origin to a destination and a number of times that each of the plurality of drivers has traveled the route;
classifying one or more drivers of the plurality of drivers as local drivers based on a determination that the number of times the one or more drivers traveled the route is greater than a threshold number;
receiving a routing request from a driver including a starting point and an endpoint and calculating an expected route from the starting point to the endpoint;
calculating a generated route from the starting point to the endpoint, wherein calculating includes determining routes local drivers have taken from the starting point to the endpoint; and
providing the generated route to the driver,
wherein calculating the generated route further includes determining a percentage of local drivers that have taken a route other than the expected route between the starting point and the endpoint and responsively setting the generated route to the expected route when the percentage is less than a threshold percentage.

2. The vehicle navigation system of claim 1, wherein the expected route between the starting point and the endpoint is one of a shortest route between the starting point and the endpoint and a fastest route between the starting point and the endpoint.

3. The vehicle navigation system of claim 1, wherein the route database includes a deviation database that includes deviations by local drivers from expected routes between the origin and the destination.

4. The vehicle navigation system of claim 3, wherein the deviation database includes one or more conditions associated with each stored deviation and wherein calculating the generated route further includes comparing one or more current conditions to the one or more conditions associated with each stored deviation.

5. The vehicle navigation system of claim 4, wherein the one or more conditions associated with each stored deviation include one of a time, a date, a traffic condition, and a weather condition.

6. The vehicle navigation system of claim 1, wherein data regarding a route that one of the plurality of drivers took from the origin to the destination is discarded and not stored in the route database based on a determination that the one of the plurality of drivers did not obey traffic laws.

7. A method for providing navigation based on local-driver route deviations, comprising:
monitoring a plurality of drivers;

storing, in a route database, a route that each of the plurality of drivers take from an origin to a destination and a number of times that each of the plurality of drivers has traveled the route;

classifying one or more drivers of the plurality of drivers as local drivers based on a determination that the number of times the one or more drivers traveled the route is greater than a threshold number;

receiving a routing request from a driver including a starting point and an endpoint and calculating an expected route from the starting point to the endpoint;

calculating a generated route from the starting point to the endpoint, wherein calculating includes determining routes local drivers have taken from the starting point to the endpoint; and providing the generated route to the driver, wherein calculating the generated route further includes determining a percentage of local drivers that have taken a route other than the expected route between the starting point and the endpoint and responsively setting the generated route to the expected route when the percentage is less than a threshold percentage.

8. The method of claim 7, wherein data regarding a route that one of the plurality of drivers took from the origin to the destination is discarded and not stored in the route database based on a determination that the one of the plurality of drivers did not obey traffic laws.

9. The method of claim 7, wherein the expected route between the starting point and the endpoint is one of a shortest route between the starting point and the endpoint and a fastest route between the starting point and the endpoint.

10. The method of claim 7, wherein the route database includes a deviation database that includes deviations by local drivers from expected routes between the origin and the destination.

11. The method of claim 10, wherein the deviation database includes one or more conditions associated with each stored deviation and wherein calculating the generated route further includes comparing one or more current conditions to the one or more conditions associated with each stored deviation.

12. The method of claim 11, wherein the one or more conditions associated with each stored deviation include one of a time, a date, a traffic condition, and a weather condition.

13. A computer program product comprising a computer readable storage medium having program instructions embodied therewith the program instructions executable by a computer processor to cause the computer processor to perform a method, comprising:

monitoring a plurality of drivers;

storing, in a route database, a route that each of the plurality of drivers take from an origin to a destination and a number of times that each of the plurality of drivers has traveled the route;

classifying one or more drivers of the plurality of drivers as local drivers based on a determination that the number of times the one or more drivers traveled the route is greater than a threshold number;

receiving a routing request from a driver including a starting point and an endpoint and calculating an expected route from the starting point to the endpoint;

calculating a generated route from the starting point to the endpoint, wherein calculating includes determining routes local drivers have taken from the starting point to the endpoint; and providing the generated route to the driver, wherein calculating the generated route further includes determining a percentage of local drivers that have taken a route other than the expected route between the starting point and the endpoint and responsively setting the generated route to the expected route when the percentage is less than a threshold percentage.

14. The computer program product of claim 13, wherein the expected route between the starting point and the endpoint is one of a shortest route between the starting point and the endpoint and a fastest route between the starting point and the endpoint.

15. The computer program product of claim 13, wherein the route database includes a deviation database that includes deviations by local drivers from expected routes between the origin and the destination.

16. The computer program product of claim 15, wherein the deviation database includes one or more conditions associated with each stored deviation and wherein calculating the generated route further includes comparing one or more current conditions to the one or more conditions associated with each stored deviation.

17. The computer program product of claim 16, wherein the one or more conditions associated with each stored deviation include one of a time, a date, a traffic condition, and a weather condition.

\* \* \* \* \*